US012078765B2

(12) United States Patent
Shimada et al.

(10) Patent No.: US 12,078,765 B2
(45) Date of Patent: Sep. 3, 2024

(54) RADIATION DETECTION ELEMENT

(71) Applicant: DAI NIPPON PRINTING CO., LTD., Tokyo (JP)

(72) Inventors: Osamu Shimada, Tokyo (JP); Tomohisa Motomura, Tokyo (JP); Toru Tanimori, Kyoto (JP); Atsushi Takada, Kyoto (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 682 days.

(21) Appl. No.: 17/235,472

(22) Filed: Apr. 20, 2021

(65) Prior Publication Data

US 2021/0239857 A1   Aug. 5, 2021

Related U.S. Application Data

(63) Continuation of application No. PCT/JP2019/041570, filed on Oct. 23, 2019.

(30) Foreign Application Priority Data

Oct. 26, 2018   (JP) ................. 2018-202037

(51) Int. Cl.
*G01T 1/185* (2006.01)
*G01T 1/02* (2006.01)
(Continued)

(52) U.S. Cl.
CPC ............... *G01T 1/185* (2013.01); *G01T 1/02* (2013.01); *G01T 1/2935* (2013.01); *H01J 47/02* (2013.01); *H01J 47/06* (2013.01)

(58) Field of Classification Search
CPC ......... G01T 1/185; G01T 1/02; G01T 1/2935; H01J 47/02; H01J 47/06
See application file for complete search history.

(56) References Cited

U.S. PATENT DOCUMENTS 6,034,373 A * 3/2000 Shahar ............ H01L 27/14676
250/370.06
6,333,504 B1 * 12/2001 Lingren ........... H01L 27/14676
257/E27.146
(Continued)

FOREIGN PATENT DOCUMENTS

CN    108140534 A    6/2018
CN    207816850 U    9/2018
(Continued)

OTHER PUBLICATIONS

May 16, 2023 Office Action issued in Chinese Patent Application No. 201980069774.0.
(Continued)

*Primary Examiner* — Karen Kusumakar
(74) *Attorney, Agent, or Firm* — Oliff PLC

(57) ABSTRACT

A radiation detection element includes a base material, a first electrode, a second electrode, a third electrode, a fourth electrode, a fifth electrode, a first external terminal, a second external terminal, a third external terminal, and a fourth external terminal. Each of the first external terminal, the second external terminal, the third external terminal, and the fourth external terminal is a solder ball, and the first external terminal, the second external terminal, the third external terminal, and the fourth external terminal are insulated from each other. A region provided on the first electrode, the second electrode, the third electrode, the fourth electrode, and the fifth electrode overlaps at least one of the first external terminal, the second external terminal, the third external terminal, and the fourth external terminal in a view vertical to the first surface side of the base material.

16 Claims, 15 Drawing Sheets

(51) Int. Cl.
*G01T 1/29* (2006.01)
*H01J 47/02* (2006.01)
*H01J 47/06* (2006.01)

(56) References Cited

U.S. PATENT DOCUMENTS

| | | | |
|---|---|---|---|
| 9,535,171 B2* | 1/2017 | Herrmann | G01T 1/2928 |
| 9,773,935 B2 | 9/2017 | Nagano et al. | |
| 2002/0134945 A1* | 9/2002 | Tanimori | G01T 1/185 |
| | | | 250/385.1 |
| 2003/0218120 A1 | 11/2003 | Shibayama | |
| 2008/0031245 A1* | 2/2008 | Pekonen | H04W 72/30 |
| | | | 370/312 |
| 2008/0061245 A1 | 3/2008 | Yamamoto | |
| 2014/0263975 A1 | 9/2014 | Nagano et al. | |
| 2018/0246226 A1 | 8/2018 | Ota et al. | |

FOREIGN PATENT DOCUMENTS

| | | |
|---|---|---|
| EP | 1492168 A1 | 12/2004 |
| JP | H05-121036 A | 5/1993 |
| JP | 3354551 B2 | 12/2002 |
| JP | 2008-064664 A | 3/2008 |
| JP | 2009-224069 A | 10/2009 |
| JP | 2012-168170 A | 9/2012 |
| JP | 2013-242320 A | 12/2013 |
| JP | 2017-181285 A | 10/2017 |
| KR | 100969123 B1 | 7/2010 |
| WO | 03/077318 A1 | 9/2003 |
| WO | 2017/061336 A1 | 4/2017 |

OTHER PUBLICATIONS

Dec. 24, 2019 Translation of Written Opinion issued in International Patent Application No. PCT/JP2019/041570.
Dec. 24, 2019 International Search Report issued in International Patent Application No. PCT/JP2019/041570.
Chernyshova et al.; "2D GEM based imaging detector readout capabilities from perspective of intense soft x-ray plasma radiation"; Review of Scientific Instruments; 2018; vol. 89; 10G106-1-10G106-5.
Jun. 16, 2020 Notice of Allowance issued in Japanese Patent Application No. 2018-202037.
Dec. 24, 2019 Written Opinion issued in International Patent Application No. PCT/JP2019/041570.
Jun. 27, 2022 Search Report issued in European Patent Application No. 19876269.2.
Jun. 18, 2024 Office Action issued in Chinese Patent Application No. 201980069774.0.

* cited by examiner

RADIATION DETECTION ELEMENT

CROSS REFERENCE TO RELATED APPLICATIONS

This application is based upon and claims the benefit of priority from the prior Japanese Patent Application No. 2018-202037, filed on Oct. 26, 2018, and PCT Application No. PCT/JP2019/41570 filed on Oct. 23, 2019, the entire contents of which are incorporated herein by reference.

FIELD

The present disclosure relates to a radiation detection element for detecting radiation using gas amplification by a pixel-type electrode.

BACKGROUND

Research on a gas electron amplification-type radiation detector by a pixel-type electrode is in progress. The gas electron amplification-type radiation detector is characterized by a large area and real-time imaging of a detection region, which was inadequate in radiation detection by a conventional detector.

Patent Literature 1 discloses a radiation detector using a pixel electrode as a detector using electron avalanche amplification in a gas (Japanese Patent No. 3354551). The radiation detector includes a pixel-type electrode provided in a pressure vessel and a drift electrode facing the pixel-type electrode. The pressure vessel is filled with a gas corresponding to the radiation to be detected. The pixel-type electrode has a plurality of anode electrodes and a plurality of cathode electrodes arranged in two dimensions in an X-direction and Y-direction.

When the radiation impinges on the gas, an electron generated by ionization of the gas is affected by an electric field between the drift electrode and the cathode electrode and moves toward the pixel electrode. The electrons are amplified similar to an avalanche due to the electric field between the anode electrode and the cathode electrode. The electrons collected by the anode electrode reach a level that can be read out as an electric signal.

Patent Literature 1 discloses a radiation detector using gas amplification by a pixel-type electrode. The radiation detector synchronizes a signal obtained from a plurality of anode electrodes arranged along an X-direction and a plurality of cathode electrodes arranged along a Y-direction with a clock signal and converts them into time and position data. A radiation track can be measured by the time data and the position data in the X-direction and the Y-direction.

SUMMARY OF THE INVENTION

A radiation detection element according to an embodiment of the present disclosure includes a base material having a first surface and a second surface opposite to the first surface; a first electrode penetrating the base material, electrically connected to the first surface side and the second surface side and exposed on the first surface side; a second electrode adjacent to the first electrode in a first direction, penetrating the base material, electrically connected to the first surface side and the second surface side and exposed on the first surface side; a third electrode adjacent to the first electrode in a second direction intersecting with the first direction, penetrating the base material, electrically connected to the first surface side and the second surface side and exposed on the first surface side; a fourth electrode adjacent to the third electrode in the first direction, adjacent to the second electrode in the second direction, penetrating the base material, electrically connected to the first surface side and the second surface side and exposed on the first surface side; a fifth electrode provided on the first surface, provided between the first electrode and the second electrode, between the second electrode and the third electrode, between the third electrode and the fourth electrode and between the fourth electrode and the first electrode, and separated from the first electrode, the second electrode, the third electrode and the fourth electrode; a first external terminal electrically connected to the first electrode on the second surface side; a second external terminal electrically connected to the second electrode on the second surface side; a third external terminal electrically connected to the third electrode on the second surface side; and a fourth external terminal electrically connected to the fourth electrode on the second surface side, wherein each of the first external terminal, the second external terminal, the third external terminal, and the fourth external terminal is a solder ball, and the first external terminal, the second external terminal, the third external terminal, and the fourth external terminal are insulated from each other, and a region provided on the first electrode, the second electrode, the third electrode, the fourth electrode, and the fifth electrode overlaps at least one of the first external terminal, the second external terminal, the third external terminal, and the fourth external terminal in a view vertical to the first surface side of the base material.

A radiation detection element according to an embodiment of the present disclosure includes a base material having a first surface and a second surface opposite to the first surface; a first electrode penetrating the base material, electrically connected to the first surface side and the second surface side and exposed on the first surface side; a second electrode adjacent to the first electrode in a first direction, penetrating the base material, electrically connected to the first surface side and the second surface side and exposed on the first surface side; a third electrode adjacent to the first electrode in a second direction intersecting with the first direction, penetrating the base material, electrically connected to the first surface side and the second surface side and exposed on the first surface side; a fourth electrode adjacent to the third electrode in the first direction, adjacent to the second electrode in the second direction, penetrating the base material, electrically connected to the first surface side and the second surface side and exposed on the first surface side; a fifth electrode provided on the first surface, provided between the first electrode and the second electrode, between the second electrode and the third electrode, between the third electrode and the fourth electrode and between the fourth electrode and the first electrode, and separated from the first electrode, the second electrode, the third electrode and the fourth electrode; a first external terminal electrically connected to the first electrode on the second surface side; a second external terminal electrically connected to the second electrode on the second surface side; a third external terminal electrically connected to the third electrode on the second surface side; and a fourth external terminal electrically connected to the fourth electrode on the second surface side, wherein each of the first external terminal, the second electrode, the third electrode, the fourth electrode, and the fourth external terminal is insulated from each other and connected to a wiring board, and a region provided on the first electrode, the second electrode, the third electrode, the fourth electrode, and the fifth electrode overlaps at least one of the first external terminal, the second external terminal, the third external terminal, and the fourth external terminal in a view vertical to the first surface side of the base material.

DESCRIPTION OF EMBODIMENT

Figure 1:
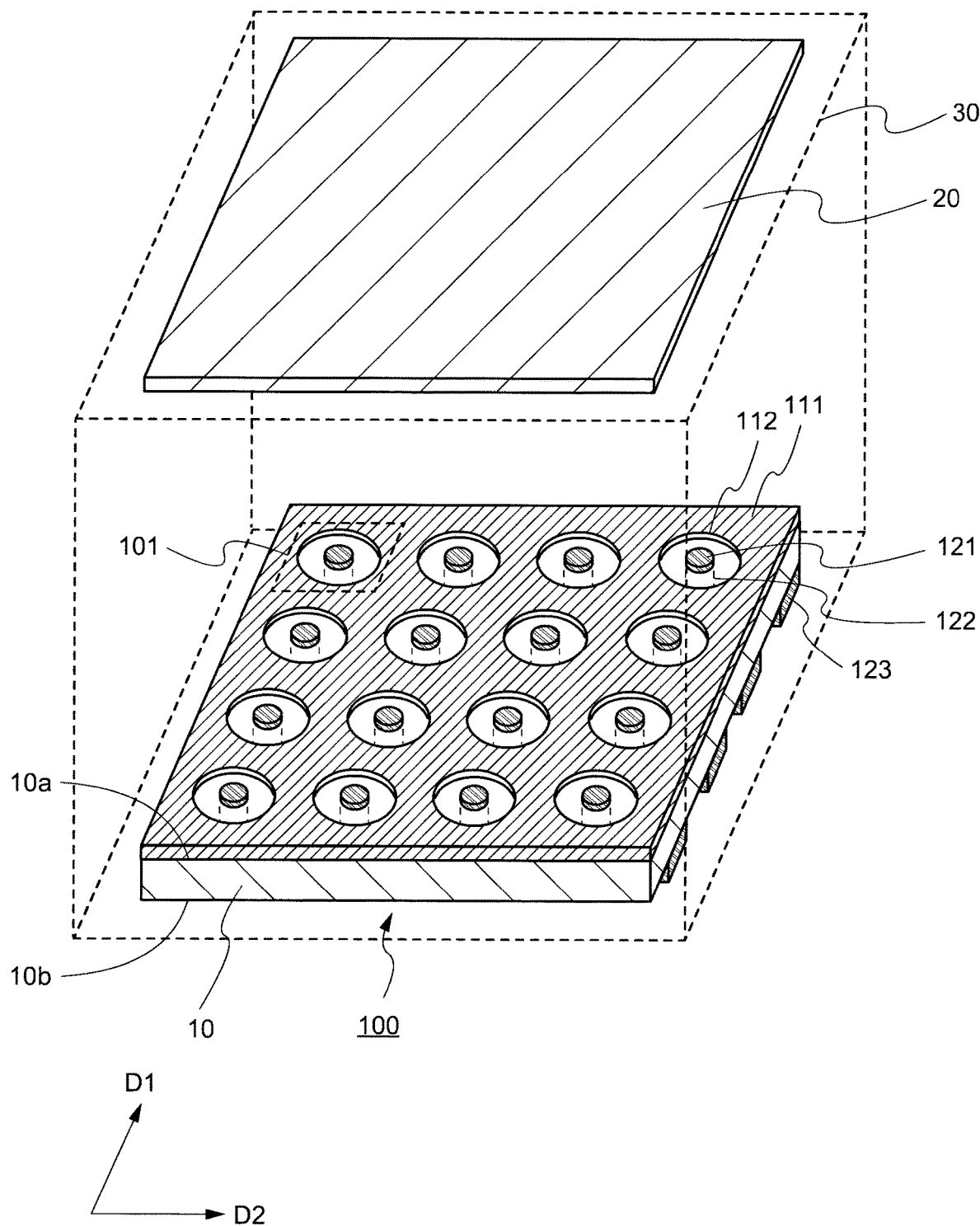
FIG. 1 is a schematic view of a radiation detection device including a radiation detection element according to an embodiment of the present disclosure.

If signals are detected simultaneously at a remote location, it is difficult for a radiation detector using a conventional pixel-type electrode to distinguish these signals. Therefore, the position detection accuracy has deteriorated.

It is an object of the present disclosure to provide a radiation detection element with improved position detection accuracy.

According to an embodiment of the present disclosure, it is possible to provide a radiation detection element with improved position detection accuracy.

Hereinafter, a radiation detection element and a radiation detection device according to an embodiment of the present disclosure will be described in detail with reference to the drawings. The radiation detection element and the radiation detection device, according to an embodiment of the present disclosure, are not limited to the following embodiments and can be implemented by performing various modifications. In all the embodiments, the same components are denoted by the same reference numerals. For the convenience of description, the dimensional ratio of the drawings may be different from the actual ratio, or a part of the structure may be omitted from the drawings. In addition, for convenience of explanation, the phrase "upper" or "lower" is used for explanation, however, for example, a first member and a second member may be arranged so that their vertical relationship is opposite from that shown in the drawing. Further, in the following explanation, a first surface and a second surface of a base material do not refer to a particular surface of the base material. They specify a surface direction or a rear surface direction of the base material, that is, a name for specifying a vertical direction with respect to the base material.

First Embodiment

An outline of a structure of a radiation detection device 200 having a radiation detection element 100 according to an embodiment of the present disclosure will be described with reference to FIG. 1 to FIG. 4.

<Outline of Radiation Detection Device>

FIG. 1 is a schematic view of the radiation detection device 200 having the radiation detection element 100 according to the present embodiment. The radiation detection device 200 according to the present embodiment includes a drift electrode 20, the radiation detection element 100, and a chamber 30. The drift electrode 20 and the radiation detection element 100 are arranged to face each other through a constant space in the chamber 30. The interior of the chamber 30 is filled with a mixed gas of a rare gas such as argon or xenon and a gas (quenching gas) having a quenching effect containing an alkane or carbon dioxide gas at an ordinary temperature such as ethane or methane. These gases may be filled as a single gas or a mixed gas of 2 or more kinds inside the chamber 30.

<Structure of Radiation Detection Element>

The radiation detection element 100 according to the present embodiment has a base material 10, a cathode electrode 111, an anode electrode 121, a through-electrode 122, and an anode pattern electrode 123. The base material 10 has a first surface 10a and a second surface 10b opposite the first surface 10a.

The anode electrode 121 has a structure in which the first surface 10a side and the second surface 10b side are electrically connected by penetrating the base material 10 and are exposed on the first surface 10a side. In the following description, although the anode electrode 121, the through-electrode 122, and the anode pattern electrode 123 will be described separately, the anode electrode 121 may include the through-electrode 122 and the anode pattern electrode 123.

The anode electrode 121 is arranged in an opening 112 of the cathode electrode 111. The anode electrode 121 is arranged in 4 rows×4 columns to match the number of the openings 112 of the cathode electrode 111. The anode electrode 121 is arranged in each of a plurality of openings 112 provided on the cathode electrode 111.

The through-electrode 122 is provided in a through-hole that penetrates from the first surface 10a of the base material to the second surface 10b on the opposite side. The through-electrode 122 is arranged in 4 rows×4 columns to match the number of the anode electrodes 121. The through-electrode 122 is connected to the anode electrode 121. In this embodiment, a part where an upper end of the through-electrode 122 is exposed corresponds to the anode electrode 121.

The anode pattern electrode 123 is arranged on the second surface 10b of the base material 10. The anode pattern electrode 123 is arranged in 4 rows×4 columns to match the number of the anode electrodes 121. Each of a plurality of anode pattern electrodes 123 is connected to the through-electrode 122. The anode pattern electrode 123 is arranged at a position corresponding to the opening 112 of the cathode electrode 111.

The cathode electrode 111 is arranged on the first surface 10a of the base material 10. In this embodiment, the cathode electrode 111 is formed of a single conductive layer. The cathode electrode 111 also has the plurality of openings 112. The plurality of openings 112 is circular. In this embodiment, the plurality of openings 112 are arranged in 4 rows×4 columns.

In this specification and the like, a part of the cathode electrode 111, the opening 112, and the anode electrode 121 are referred to as a pixel electrode 101. The pixel electrode 101 is approximately square. In FIG. 1, although 16-pixel electrodes 101 of 4 rows×4 columns are arranged in one radiation detection element 100, the number of the pixel electrodes 101 is not limited thereto. For example, the radiation detection element 100 may have 576-pixel electrodes 101 of 24 rows×24 columns.

<Structure of Radiation Detection Element>

Figure 2:
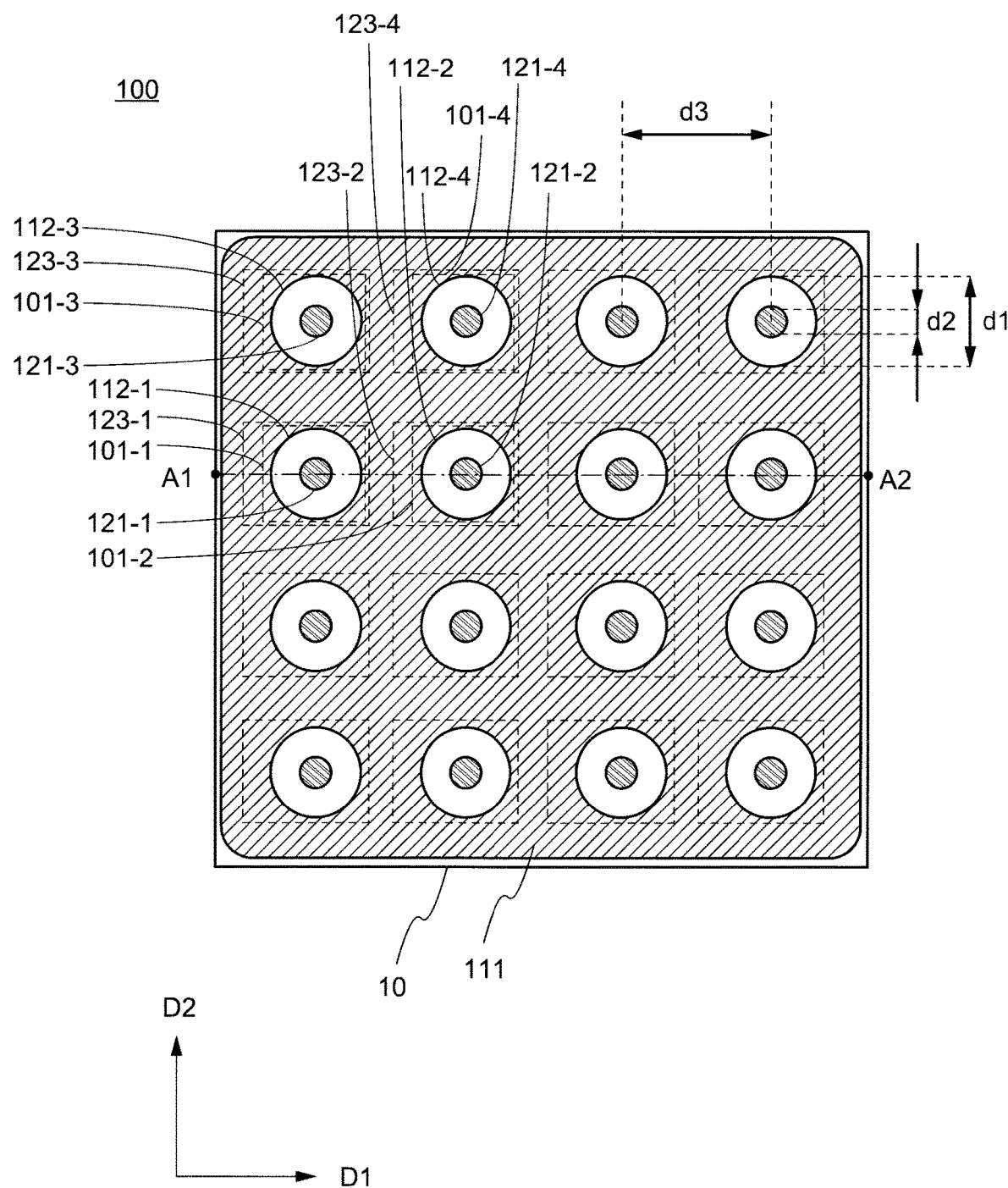
FIG. 2 is a plan view of a radiation detection element according to an embodiment of the present disclosure.
Figure 3:
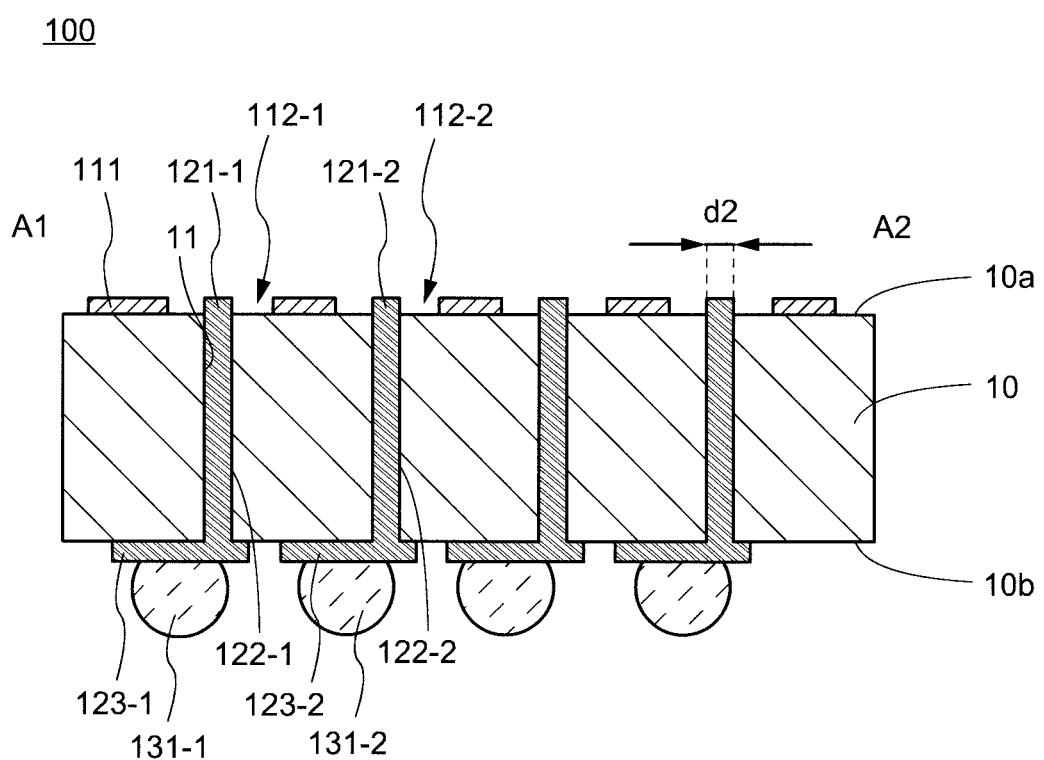
FIG. 3 is a cross-sectional view of a radiation detection element according to an embodiment of the present disclosure.

Next, the structure of the pixel electrode 101 included in the radiation detection element 100 according to the present embodiment will be described in detail. FIG. 2 is a plan view of the radiation detection element 100 according to an embodiment of the present disclosure. FIG. 3 is a cross-sectional view along line A1-A2 shown in FIG. 2.

In the radiation detection element 100 shown in FIG. 2 and FIG. 3, pixel electrodes 101-1, 101-2, 101-3, and 101-4 are explained as an example. In the following description, when the pixel electrodes 101-1, 101-2, 101-3, and 101-4 are not distinguished, they are referred to as the pixel electrode 101. The same applies to the pixel electrodes 101-1, 101-2, 101-3, and 101-4.

The pixel electrode 101-1 includes a base material 10, an anode electrode 121-1, a through-electrode 122-1, an anode pattern electrode 123-1, and the cathode electrode 111. The pixel electrode 101-2 includes the base material 10, an anode electrode 121-2, a through-electrode 122-2, an anode pattern electrode 123-2, and the cathode electrode 111.

First, a structure of the anode electrode 121 will be described. As shown in FIG. 3, the anode electrode 121 has a structure in which the first surface 10a and the second surface 10b are electrically connected by penetrating the base material 10 and are exposed on the first surface 10a side. The anode electrode 121 is arranged on the first surface 10a of the base material 10. In this embodiment, the anode electrode 121 has a structure in which the upper end of the through-electrode 122 protrudes from the first surface 10a of the base material 10 in the opening 112 of the cathode electrode 111, although the anode electrode 121 is not limited to this structure. The anode electrode 121 may have a structure in which the upper end of the through-electrode 122 does not protrude from the first surface 10a of the base material 10 in the opening 112 of the cathode electrode 111. The anode electrode 121 may have, for example, a shape in which the upper end of the through-electrode 122 substantially coincides with the first surface 10a of the base material 10, or a shape in which the upper end of the through-electrode 122 is located inside the base material 10. However, by forming the height of the cathode electrode 111 and the anode electrode 121 at the first surface 10a of the base material 10 substantially the same, discharging is suppressed even if a high voltage is applied in order to concentrate the electric power line on the anode electrode 121.

Next, positions where each of the anode electrode 121-1, the anode electrode 121-2, the anode electrode 121-3, and an anode electrode 121-4 are arranged, will be described. As shown in FIG. 2, the anode electrode 121-2 adjacent to the anode electrode 121-1 in a first direction D1 using the anode electrode 121-1 as a reference. The anode electrode 121-3 is adjacent to the anode electrode 121-1 in a second direction D2 intersecting the first direction D1. The anode electrode 121-4 is adjacent to the anode electrode 121-3 in the first direction D1 and to the anode electrode 121-2 in the second direction D2.

Anode pattern electrodes 123-1, 123-2, 123-3, and 123-4 are arranged on the second surface 10b side of the base material 10. The anode pattern electrodes 123-1, 123-2, 123-3, and 123-4 are respectively insulated. The anode pattern electrode 123-1 is connected to the through-electrode 122-1 on the second surface 10b of the base material 10. The anode pattern electrode 123-2 is connected to the through-electrode 122-2 on the second surface 10b of the base material 10. The anode pattern electrodes 123-3 and 123-4 are also connected to the through-electrode 122 (not shown) on the second surface 10b of the base material 10.

A through-hole 11 connects from the first surface 10a to the second surface 10b of the base material 10. In this embodiment, the through-hole 11 and the through-electrode 122 are cylindrical. The through-hole 11 has substantially the same inner diameter in a thickness direction of the base material 10. The inner diameter of the through-hole 11 refers to the maximum diameter and refers to the length of the two points where the distance on the outline of the through-hole 11 is maximized in a cross-section perpendicular to the thickness direction of the base material 10 of the through-hole 11. Therefore, the inner diameter of the through-electrode 122 on the first surface 10a side of the through-hole 11 and the inner diameter of the through-electrode 122 on the second surface 10b side of the through-hole 11 are substantially the same.

An aspect ratio of the through-hole 11 is preferably in a range of 4 or more. The aspect ratio of the through-hole 11 is defined as a depth of the through-hole 11 (the thickness of the base material 10) with respect to the inner diameter of the through-hole 11 (if the through-hole 11 has a different inner diameter in the thickness direction of the base material 10, the aspect ratio takes the maximum value). If the aspect ratio of the through-hole 11 is less than 4, leakage of an electric line of force occurs between the anode pattern electrode 123 and the cathode electrode 111. Thus, the electric line of force is not concentrated between the anode electrode 121 and the cathode electrode 111, and the gas amplification factor will decrease.

The cathode electrode 111 is arranged on the first surface 10a side of the base material 10. The cathode electrode 111 is provided between the anode electrode 121-1 and the anode electrode 121-2, between the anode electrode 121-2 and the anode electrode 121-3, between the anode electrode 121-3 and the anode electrode 121-4, and between the anode electrode 121-4 and the anode electrode 121-1. The cathode electrode 111 is provided apart from each of the anode electrodes 121-1, 121-2, 121-3, and 121-4. Specifically, openings 112-1, 112-2, 112-3, and 112-4 are provided on the cathode electrode 111 to surround each of the anode electrodes 121-1, 121-2, 121-3, and 121-4. The cathode electrode 111 is insulated from the anode electrodes 121-1, 121-2, 121-3, and 121-4.

In FIG. 2, a structure is shown in which the anode electrode 121 is provided in the opening 112 of the cathode electrode 111 so that a distance between the cathode electrode 111 and the anode electrode 121 is constant in all directions with reference to the anode electrode, however, the structure is not limited to this structure. For example, in a certain direction with reference to the anode electrode 121, the distance between the cathode electrode 111 and the anode electrode 121 may be closer than the other direction. With such a structure, the detection sensitivity can be enhanced in a certain direction. In FIG. 2, although the cathode electrode 111 surrounds the anode electrode 121, a portion of the cathode electrode 111 may be opened.

An external terminal 131-1 is connected to the anode pattern electrode 123-1, and an external terminal 131-2 is connected to the anode pattern electrode 123-2. Further, although not shown, the anode pattern electrode 123-3 is connected to the external terminal, and the anode pattern electrode 123-4 is connected to the external terminal. Further, a plurality of external terminals connected to each of the anode pattern electrodes 123-1, 123-2, 123-3, and 123-4 are respectively insulated. In FIG. 3, although an example using a solder ball is shown as the external terminals 131-1, 131-2, the example is not limited thereto. A copper pillar, a lead, or a terminal pad and the like may be used as the external terminals 131-1 and 131-2.

<Each Parameter of Radiation Detection Element>

An example of each parameter of the radiation detection element 100 according to an embodiment of the present disclosure will be described below. Each parameter shown below is an example and may be changed as appropriate.

External form of the base material: 9.6 mm-square
Width of the cathode electrode: 9550 µm-square
Opening diameter d1 of the cathode electrode: 250 µm
Inner diameter d2 of the through-hole: 50 µm
Pitch d3 of the anode electrode: 400 µm
Thickness of the base material: 300 µm The cathode electrode 111 preferably has a region slightly smaller than the external shape of the base material 10. The cathode electrode 111 is preferably arranged at least 20 µm inside of the end of the base material 10, for example. As a result, the cathode electrode 111 can be prevented from peeling off from the base material 10.

The inner diameter d2 of the through-hole 11 is preferably slightly smaller than the upper end of the through-electrode 122. As a result, when the upper end of the through-electrode 122 is etched, it is possible to suppress the etchant from entering the inside of the through-hole 11 and prevent the through-electrode 122 in the through-hole 11 from being etched.

An organic insulating material can be used as the base material 10. As an organic insulating base material, polyimide, epoxy, benzocyclobutene, polyamide, phenol, silicone, fluorine, liquid crystal polymer, polyamideimide, polybenzoxazole, cyanate, aramid, polyolefin, polyester, BT resin, FR-4, FR-5, polyacetal, polybutylene terephthalate, syndiotactic polystyrene, polyphenylene sulfide, polyether ether ketone, polyether nitrile, polycarbonate, polyphenylene ether polysulfone, polyether sulfone, polyarylate, polyetherimide, and the like can be used. Further, an inorganic material such as glass, silicon, or ceramics can be used as the base material.

<Conventional Radiation Detection Method>

Next, a principle of radiation detection of a conventional radiation detection element 500 will be described with reference to FIG. 15.

Figure 15:
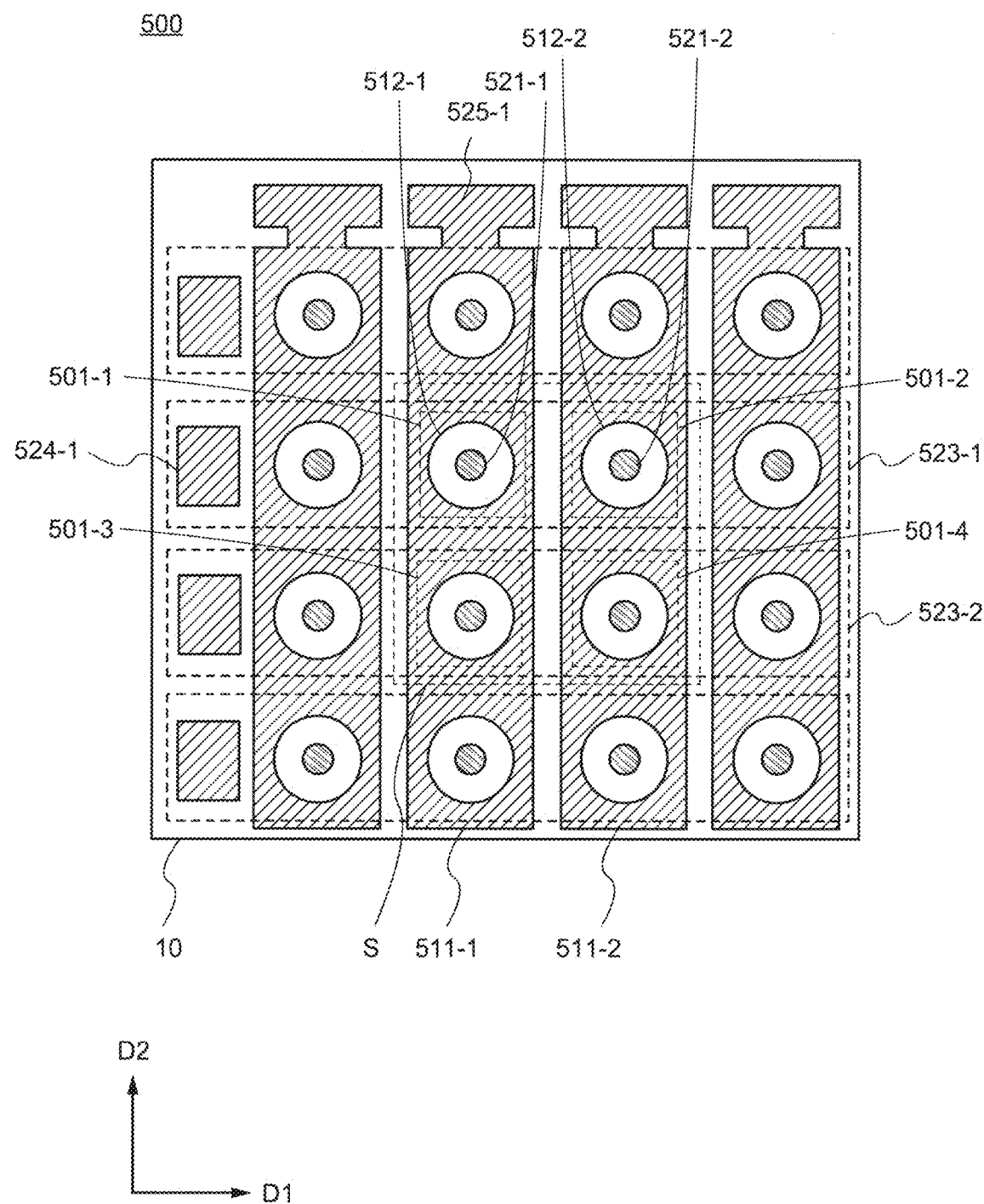
FIG. 15 is a plan view of a conventional radiation detection element.

FIG. 15 is a plan view of the conventional radiation detection element 500. In the radiation detection element 500, a plurality of anode pattern electrodes 523-1 and 523-2 (if not distinguished, referred to as an anode pattern electrode 523) is arranged along the D2 direction, and a plurality of cathode electrodes 511-1 and 511-2 (if not distinguished, referred to as a cathode electrode 511) is arranged along the D1 direction. The plurality of cathode electrodes 511-1 and 511-2 are provided on the first surface of the base material 10, and the plurality of anode pattern electrodes 523-1 and 523-2 are provided on the second surface of the base material 10.

The radiation detection method of the conventional radiation detection element 500 will be described by exemplifying pixel electrodes 501-1, 501-2, 501-3, and 501-4 (if not distinguished, referred to as a pixel electrode 501). In the pixel electrode 501-1, an anode electrode 521-1 is arranged on an opening 512-1 of the cathode electrode 511. The anode electrode 521-1 is connected to a through-electrode (not shown) that penetrates the base material 10. The through-electrode is connected to the anode pattern electrode 523-1. Further, in the pixel electrode 501-2, an anode electrode 521-2 is arranged in an opening 512-2 of the cathode electrode 511-2. The anode electrode 521-2 is connected to a through-electrode (not shown) that penetrates the base material 10. The through-electrode is connected to the anode pattern electrode 523-1. If the anode electrode 521-1 and the anode electrode 521-2 are not distinguished, they are collectively referred to as an anode electrode 521. A detailed description of the structures of the pixel electrodes 501-3 and 501-4 is omitted.

In FIG. 15, an electric field is formed by applying a voltage between the cathode electrode 511 and the anode electrode 521. The cathode electrode 511 is connected to a ground (GND), and a voltage is also applied between a drift electrode (not shown) and the cathode electrode 511 to form an electric field.

Due to the effect of the electric field generated between the drift electrode and the cathode electrode 511 when radiation is incident, the radiation forms an electron cloud due to the interaction with the gas present in the chamber. Each electron of the electron cloud is attracted in the direction of pixel electrode 501, including the anode electrode 521 and the cathode electrode 511. At this time, the attracted electron collides with a gas atom and ionizes the gas atom. The electron ionized by the gas amplification proliferates similar to an avalanche, and an electron group is collected to such an extent by the anode electrode 521 that it can be read out as an electric signal. Next, the electric signal can be read from the external terminal (e.g., an external terminal 524-1) through the anode pattern electrode 523 to the outside. On the other hand, a positive charge induced in the electron group is generated in the cathode electrode 511, and an electrical signal thereby obtained can be read out from the external terminal (e.g., external terminal 525-1) of the cathode electrode 511 to the outside. By measuring these electric signals in time series, tracks of charged particles can be measured.

However, in the conventional radiation detection element 500, when the signals are simultaneously detected at distant locations, it isn't easy to separate these signals from each other. Specifically, this phenomenon will be described with reference to the anode pattern electrodes 523-1 and 523-2, and the cathode electrode 511-1 and 511-2. The pixel electrodes 501-1 and 501-2, 501-3, and 501-4 are arranged at a position S where the anode pattern electrodes 523-1 and 523-2, and the cathode electrodes 511-1 and 511-2 intersect.

For example, it is assumed that the signals are detected simultaneously in the anode pattern electrode 523-1 and the anode pattern electrode 523-2, and the signals are detected simultaneously in the cathode electrode 511-1 and the cathode electrode 511-2, and these signals are determined to match. In this case, it could not be determined whether the signals were detected simultaneously at the pixel electrode 501-1 and the pixel electrode 501-4 or simultaneously at the pixel electrode 501-2 and the pixel electrode 501-3. Therefore, the position detection accuracy of the radiation detection element 500 has deteriorated.

<Radiation Detection Method According to the Present Embodiment>

Next, a principle of radiation detection of the radiation detection element 100 according to the present embodiment will be described with reference to FIG. 4.

In the radiation detection element 100 according to the embodiment of the present disclosure, one cathode electrode 111 and a plurality of anode electrodes 121 are provided on the first surface 10*a* of the base material 10. Each of the plurality of anode electrodes 121 and each of the plurality of anode pattern electrodes 123 is connected on the second surface 10*b* of the base material 10. Each of the plurality of anode pattern electrodes 123 is insulated. Each of the plurality of anode pattern electrodes 123 are connected to each of a plurality of external terminals (not shown).

Figure 4:
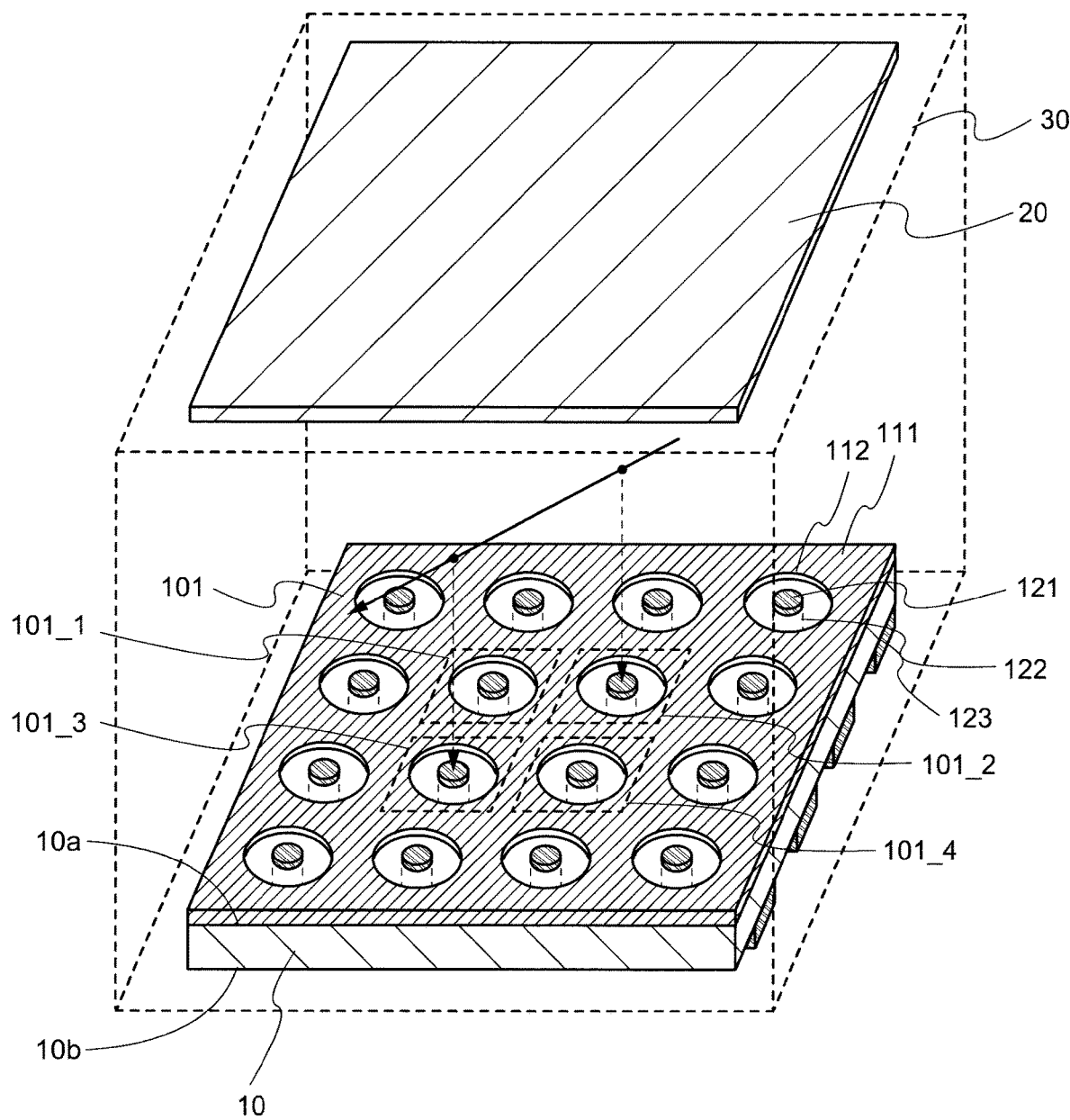
FIG. 4 is a schematic view of a radiation detection device including a radiation detection element according to an embodiment of the present disclosure.

In FIG. 4, it is assumed that the signals were detected simultaneously at the pixel electrode 101-1 and the pixel electrode 101-4 among the pixel electrodes 101-1, 101-2, 101-3, and 101-4, and simultaneously at the pixel electrode 101-2 and the pixel electrode 101-3. In this embodiment, the anode pattern electrodes included in each of the pixel electrodes 101-1, 101-2, 101-3, and 101-4 are respectively insulated. Therefore, the signals detected in each pixel electrode 101-1, 101-2, 101-3 and 101-4 can be read through the external terminal from the respective anode pattern electrodes. Thus, even if the signal is detected simultaneously at the pixel electrode 101-1 and the pixel electrode 101-4 and the signal is detected simultaneously at the pixel electrode 101-2 and the pixel electrode 101-3, the signal detected simultaneously at the pixel electrode 101-1, and the pixel electrode 101-4 and the signal detected simultaneously at the pixel electrode 101-2 and the pixel electrode 101-3 can be distinguished. Thus, it is possible to improve the location information accuracy of the radiation detection element 100. Further, since matching processing for acquiring the detection location information is not required, it is possible to improve the signal processing speed.

In FIG. 1, although an example is described in which the plurality of pixel electrodes 101 are arranged in 4 rows×4 columns, however the arrangement is not limited thereto. The plurality of pixel electrodes 101 may be arranged in a close-packed array.

<Structure of External Terminal of Radiation Detection Element>

Next, an external terminal of the conventional radiation detection element 500 will be described. The conventional radiation detection element 500 has a structure in which the external terminals 524-1 and 525-1 are connected to a wiring substrate after mounting on the wiring substrate or the like. Therefore, the external terminals 524-1 and 525-1 could be configured only in a peripheral portion of the base material 10 of the radiation detection element 500. Further, the number of the external terminals is also limited because the length of one side of the base material 10 of the radiation detection element 500 is also limited.

As shown in FIG. 3, the radiation detection element 100 according to an embodiment of the present disclosure has a structure in which an external terminal 131 is connected to the anode pattern electrode 123. With such a structure, since it is possible to connect the plurality of external terminals 131 collectively to the wiring substrate, the assembly manufacturing time of the radiation detection element 100 can be reduced. In addition, since it is not necessary to provide an external terminal on the first surface 10*a* of the base material 10, a region for forming the pixel electrode 101 can be increased.

Second Embodiment

A radiation detection element 100A according to the present embodiment is different from the cathode electrode 111 of the radiation detection element 100 according to the first embodiment in that it has a plurality of cathode electrodes 111A. The structure of the radiation detection element 100A, other than the structure of the cathode electrode 111A, is the same as the structure of the radiation detection element 100. Therefore, the same portions or portions having the same functions as those of the radiation detection element 100 are denoted by the same reference numerals, and repetitive descriptions thereof are omitted.

<Structure of Radiation Detection Element>

Figure 5:
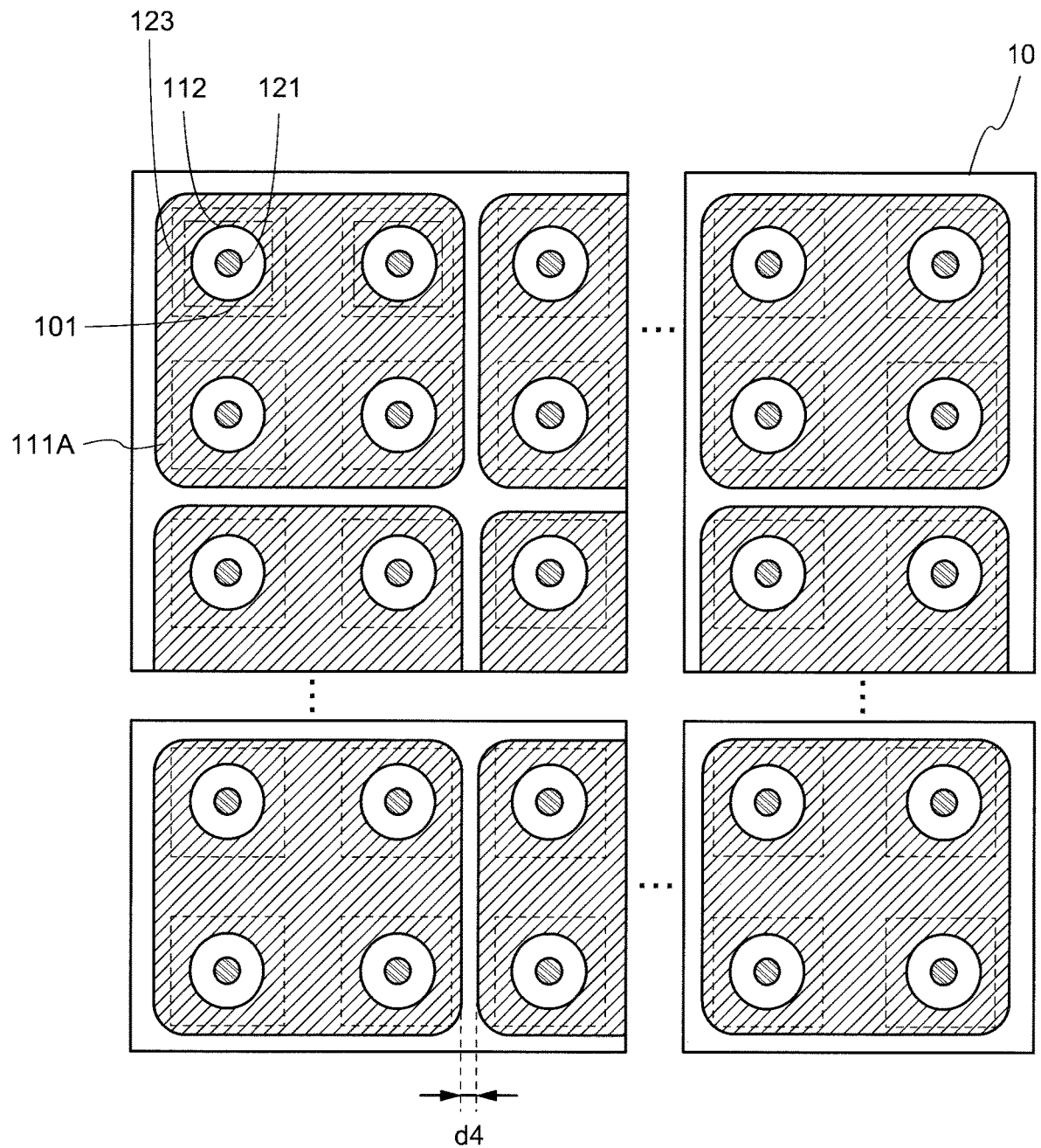
FIG. 5 is a plan view of a radiation detection element according to an embodiment of the present disclosure.

The structure of the radiation detection element 100A according to the present embodiment will be described in detail with reference to FIG. 5. FIG. 5 is a plan view of the radiation detection element 100A according to an embodiment of the present disclosure.

In the radiation detection element 100A shown in FIG. 5, the cathode electrode 111 is divided into the plurality of cathode electrodes 111A. The cathode electrode 111A has the plurality of openings 112. FIG. 5 is an example in which the plurality of openings 112 of the cathode electrode 111A is arranged in 2 rows×2 columns. The number of the cathode electrodes 111A to be divided is not limited to the form shown in FIG. 5. Also, the number of the plurality of openings 112 included in one cathode electrode 111A is not limited to the form shown in FIG. 5. A width d4 of the adjacent cathode electrodes 111A may be 20 μm, for example, and it is sufficient that the adjacent cathode electrodes 111A are insulated.

The anode electrode 121 is arranged on each of the plurality of openings 112 provided on the cathode electrode 111A.

The anode pattern electrode 123 is arranged on the second surface 10*b* of the base material 10. The anode pattern electrode 123 is arranged to match the number of the anode electrodes 121. The anode pattern electrode 123 is connected to the anode electrode 121 via a through-electrode (not shown). The anode pattern electrode 123 is arranged at a position corresponding to the opening of the cathode electrode 111A.

<Radiation Detection Method According to the Present Embodiment>

When radiation enters the radiation detection device having the radiation detection device 100A according to the present embodiment, the radiation and the gas react with each other with a certain degree of chance to emit electrons having kinetic energy. When this charge reaches the radiation detection element 100A by the electric field added by the drift electrode 20 and the radiation detection element 100A, the charge is amplified by the electric field's electron avalanche caused by the electric field cathode electrode 111 and the anode electrode 121 to generate a signal.

On the other hand, the electron avalanche and the amplification of the charges cause local potential fluctuations. Power is supplied to the portion where electronic avalanche has occurred to stabilize the potential. This power supply is performed from a power supply terminal connected to the cathode electrode 111A. Therefore, the potential between the power supply terminal and the cathode electrode 111A where the electron avalanche occurs becomes unstable.

As shown in this embodiment, a plurality of cathode electrodes 111A are provided separately, and a potential is supplied to each. At this time, the potentials supplied to the plurality of cathode electrodes 111A are preferably the same. It is possible to suppress the potential of each of the divided cathode electrodes 111A from being unstable. Further, by equalizing each area of the divided cathode electrode 111A, in-plane variation of the potential supply, and variation of an electron amplification factor can be suppressed.

Third Embodiment

In this embodiment, in a radiation detection element 100B, and a structure of an external terminal 132 connected to the cathode electrode 111 will be described. The structure of the radiation detection element 100B, other than the structure of the external terminal 132, is the same as the radiation detection element 100. Therefore, the same portions or portions having the same functions as those of the radiation detection element 100 are denoted by the same reference numerals, and repetitive descriptions are omitted.
<Structure of Radiation Detection Element>

Figure 6:
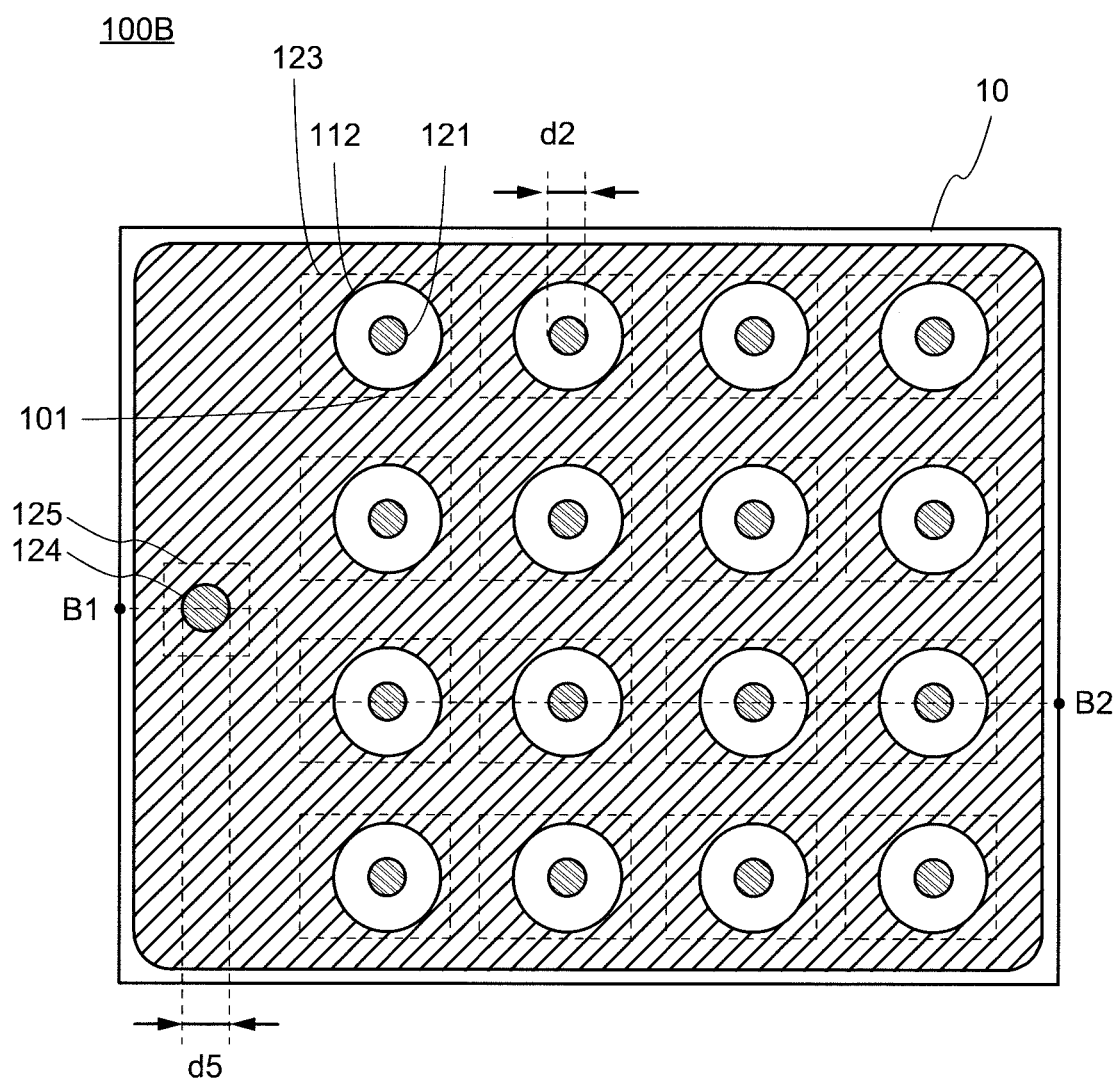
FIG. 6 is a plan view of a radiation detection element according to an embodiment of the present disclosure.
Figure 7:
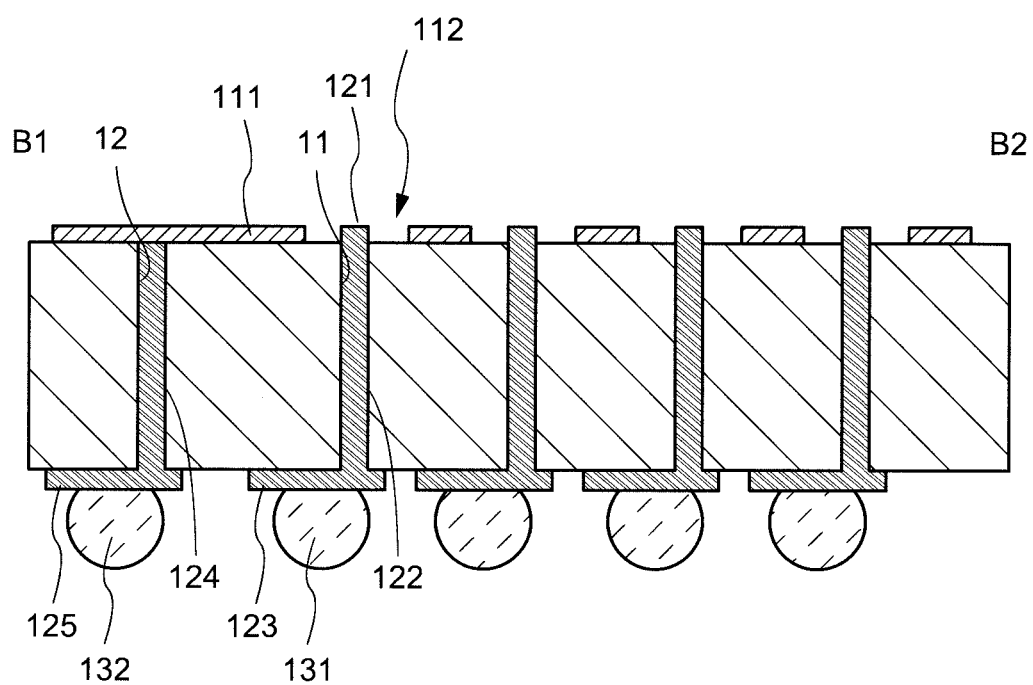
FIG. 7 is a cross-sectional view of a radiation detection element according to an embodiment of the present disclosure.

Next, a structure of the radiation detection element 100B according to the present embodiment will be described with reference to FIG. 6 and FIG. 7. FIG. 6 is a plan view of the radiation detection element 100B according to the present embodiment. FIG. 7 is a cross-sectional view along line B1-B2 shown in FIG. 6.

The radiation detection element 100B shown in FIG. 6 and FIG. 7 includes the cathode electrode 111 provided on the first surface 10a of the base material 10, a through-electrode 124 provided on a through-hole 12 of the base material 10, and a conductive layer 125 provided on the second surface 10b of the base material 10. The cathode electrode 111 is connected to the through-electrode 124, and the through-electrode 124 is connected to the conductive layer 125. Further, the conductive layer 125 is connected to the external terminal 132. The external terminal 132 is insulated from each of the plurality of external terminals 131.

By forming the external terminal 132 connected to the cathode electrode 111, the same structure as the external terminal 131 connected to the anode electrode 121 is obtained, and the radiation detection element 100B can be easily mounted on a wiring substrate.

By forming the inner diameter d2 of the through-hole 11 on which the through-electrode 122 is provided and an inner diameter d5 of the through-hole 12 on which the through-electrode 124 is substantially provided to the same length, the through-hole 11 and the through-hole 12 can be formed simultaneously on the base material 10. Therefore, productivity when forming the radiation detection element 100B is improved.
<First Modification>

Figure 8:
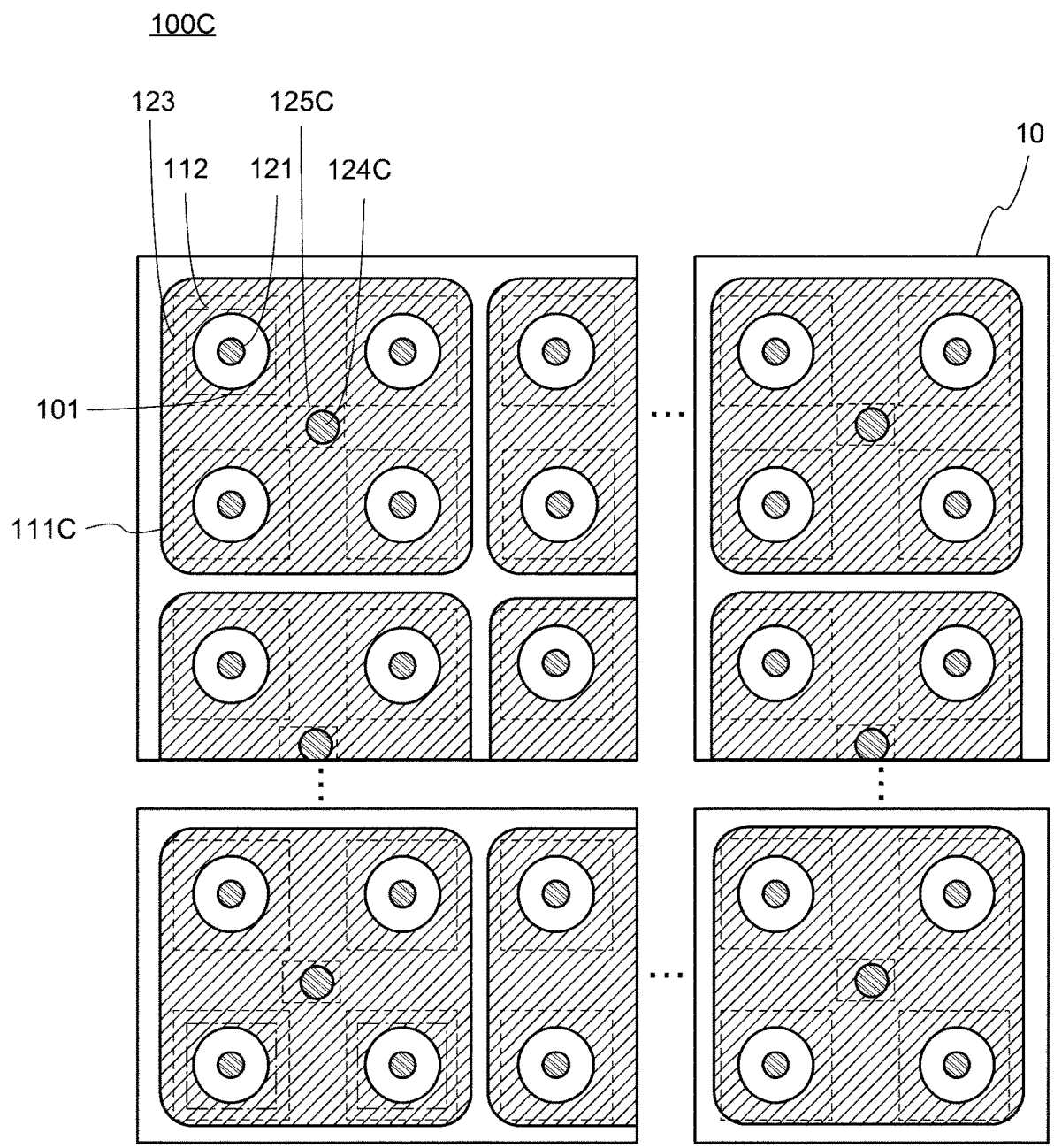
FIG. 8 is a plan view of a radiation detection element according to an embodiment of the present disclosure.

Next, a radiation detection element 100C having a structure partially different from that of the radiation detection element 100A shown in FIG. 5 will be described with reference to FIG. 8. FIG. 8 is a top view of the radiation detection element 100C according to the present embodiment.

In the radiation detection element 100C shown in FIG. 8, similar to the radiation detection element 100A shown in FIG. 5, the cathode electrode 111 is divided into a plurality of cathode electrodes 111C. The cathode electrode 111C provided on the first surface 10a of the base material 10 is connected to a through-electrode 124C provided on the through-hole of the base material 10. The through-electrode 124C is connected to a conductive layer 125C provided on the second surface 10b of the base material 10. The conductive layer 125C is connected to an external terminal (not shown). The external terminal is insulated from the plurality of external terminals 131.

To equalize the potential distribution in the plane of the plurality of cathode electrodes 111C, the through-electrode 124C connected to each of the plurality of cathode electrodes 111C is preferably arranged at equal intervals.

In the radiation detection element 100C, by forming the external terminal connected to the cathode electrode 111C with the same structure as the external terminal connected to the anode electrode 121, the radiation detection element 100C can be easily mounted on the wiring substrate. Further, even when the cathode electrode 111 is divided into the plurality of cathode electrodes 111C, the same potential can be supplied to each of the plurality of cathode electrodes 111C from the wiring substrate.

Fourth Embodiment

In a radiation detection element 100D according to the present embodiment, a structure in which the anode pattern electrode 123 and the external terminal 131 are connected via a wiring layer 142 will be described with reference to FIG. 9. Repetitive descriptions of the structure of the radiation detection element 100D which are the same as the structure of the radiation detection element 100 are omitted.
<Structure of Radiation Detection Element>

The structure of the radiation detection element 100D according to the present embodiment will be described. FIG. 9 is a cross-sectional view of the radiation detection element 100D according to the present embodiment.

Figure 9:
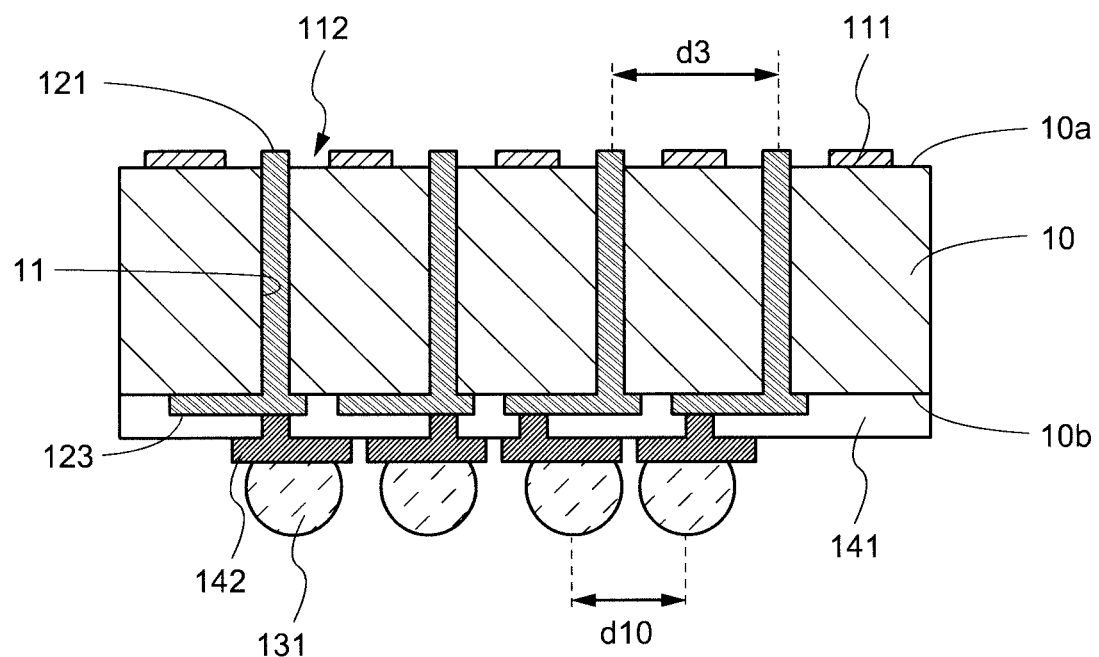
FIG. 9 is a cross-sectional view of a radiation detection element according to an embodiment of the present disclosure.

As shown in FIG. 9, in the radiation detection element 100D, an insulating layer 141 is provided on the plurality of anode pattern electrodes 123 provided on the second surface 10b of the base material 10. A plurality of wiring layers 142 are provided on the insulating layer 141. Each of the plurality of wiring layers 142 are connected to each of the anode pattern electrodes 123. The wiring layer 142 is connected to the external terminal 131.

The layout of the external terminal 131 can be adjusted by connecting the anode pattern electrode 123 to the external terminal 131 via the wiring layer 142. Thus, a pitch d10 of the adjacent external terminal 131 can be smaller than the pitch d3 of the adjacent anode electrode 121. When the radiation detection element becomes large-size, failures occur in the external terminal's connection by a thermal expansion difference between the wiring substrate to be mounted, and there is a possibility that reliability deteriorates. However, by connecting the anode pattern electrode 123 and the external terminal 131 via the wiring layer 142, it is possible to alleviate the thermal expansion difference between the radiation detection element 100D and the wiring substrate. When a plurality of radiation detection elements 100D are arranged adjacent to each other on the wiring substrate, it is possible to prevent a dead space from being generated between the radiation detection elements 100D.

Fifth Embodiment

An example in which a radiation detection element 100E according to the present embodiment has a structure in which insulating layers 143 and 144 are respectively provided on the first surface 10a and the second surface 10b of the base material 10 will be described with reference to FIG. 10.

The insulating layer 143 is provided on the first surface 10a of the base material 10. An opening is provided in the insulating layer 143 corresponding to the position where the through-electrode 122 is formed. The through-electrode 122 and the anode electrode 121 are electrically connected through the opening provided in the insulating layer 143. The top surface of the anode electrode 121 is exposed from the surface of the insulating layer 143. The cathode electrode 111 is provided on the insulating layer 143. Although a plan view of the cathode electrode 111 is not particularly shown, as shown in FIG. 2, one cathode electrode 111 may be provided, and as shown in FIG. 5, the plurality of cathode electrodes 111A may be provided. In this embodiment, the cathode electrode 111 and the anode electrode 121 can be formed by processing a single conductive layer having the same material.

The surface of the through-electrode 122 may be roughened, or unevenness may occur in a manufacturing process such as an etching step when forming the through-hole 11 on the base material 10 and a conductive plating step when forming the through-electrode 122. By providing the insulating layer 143 on the first surface 10a of the base material 10, it is possible to alleviate the surface unevenness of the first surface 10a. In addition, since the adhesion between the first surface 10a of the base material 10 and the cathode electrode 111 can be improved, it is possible to prevent the cathode electrode 111 from peeling off. Further, the cathode electrode 111 and the anode electrode 121 can be formed by processing one conductive layer having the same material on the insulating layer 143. This makes it easier to match the height of the cathode electrode 111 and the height of the anode electrode 121 as compared to when forming the anode electrode 121 by the through-electrode 122.

The insulating layer 141 is provided on the second surface 10b of the base material 10. An opening is provided in the insulating layer 141 corresponding to the position where the through-electrode 122 is formed. The through-electrode 122 and the anode pattern electrode 123 are electrically connected through the opening provided in the insulating layer 141. The anode pattern electrode 123 is provided on the insulating layer 141.

By providing the insulating layer 141 on the second surface 10b of the base material 10, it is possible to alleviate the surface unevenness of the second surface 10b. In addition, since the adhesion between the second surface 10b of the base material 10 and the anode pattern electrode 123 can be improved, it is possible to prevent the anode pattern electrode 123 from peeling off.

Figure 10:
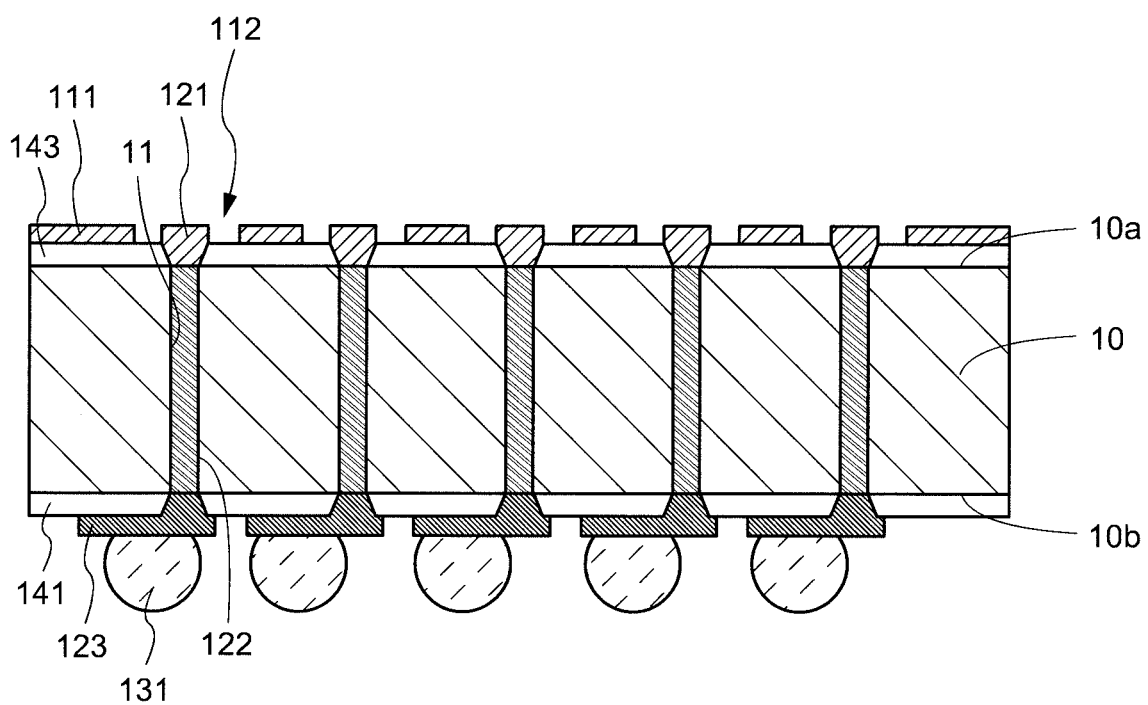
FIG. 10 is a cross-sectional view of a radiation detection element according to an embodiment of the present disclosure.

In FIG. 10, although an example is shown in which the insulating layer 143 is provided between the cathode electrode 111 and the base material 10, and the insulating layer 141 is provided between the anode electrode 121 and the base material 10, an embodiment of the present disclosure is not limited thereto. At least one of the insulating layer 143 and the insulating layer 141 may be omitted.

Organic insulating materials can be used as the insulating layers 141 and 143. As an organic insulating layer, polyimide, epoxy resin, polyimide resin, benzocyclobutene resin, polyamide, phenolic resin, silicone resin, fluororesin, liquid crystal polymer, polyamideimide, polybenzoxazole, cyanate resin, aramid, polyolefin, polyester, BT resin, FR-4, FR-5, polyacetal, polybutylene terephthalate, syndiotactic polystyrene, polyphenylene sulfide, polyether ether ketone, polyether nitrile, polycarbonate, polyphenylene ether polysulfone, polyether sulfone, polyarylate, polyetherimide, and the like can be used. Further, as the insulating layer, a member that easily allows gas to pass through can be used. For example, a porous material containing bubbles inside may be used.

The thicknesses of the insulating layers 141 and 143 are not particularly limited and can be appropriately selected, for example, from a range of 1 μm or more to 20 μm or less. If the thicknesses of the insulating layers 141 and 143 are thinner than the lower limit, surface insulation of the anode electrode 121 and the cathode electrode 111 is reduced, which may cause an electric discharge. Further, if the thicknesses of the insulating layers 141 and 143 are thicker than the above upper limit, the forming step of the opening becomes long, the manufacturing process becomes long, and the manufacturing cost rises. Further, the inner stress caused by the insulating layers 141 and 143 causes the insulating member to warp and easily crack.

Sixth Embodiment

Figure 11:
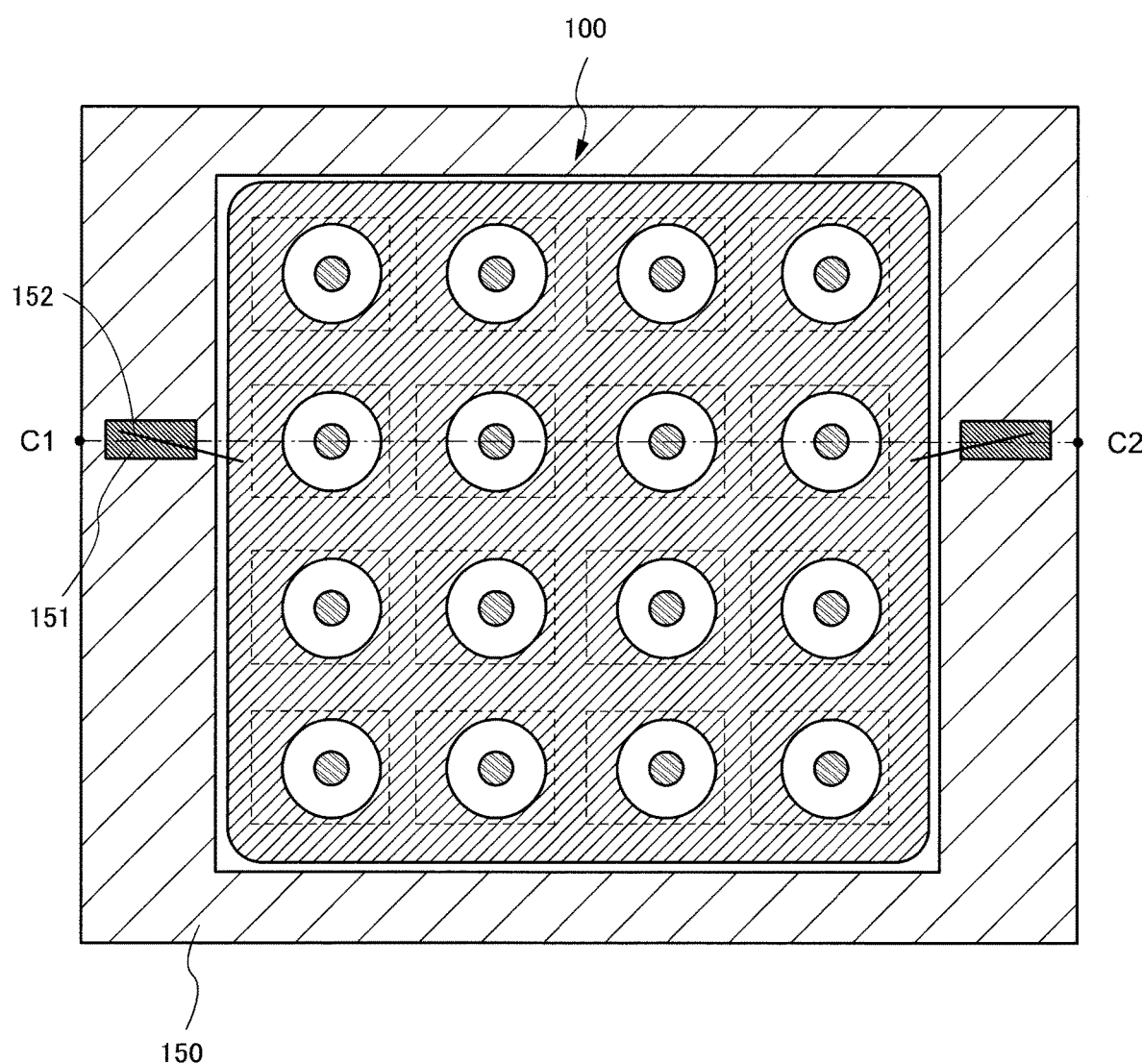
FIG. 11 is a plan view of a radiation detection element according to an embodiment of the present disclosure.
Figure 12:
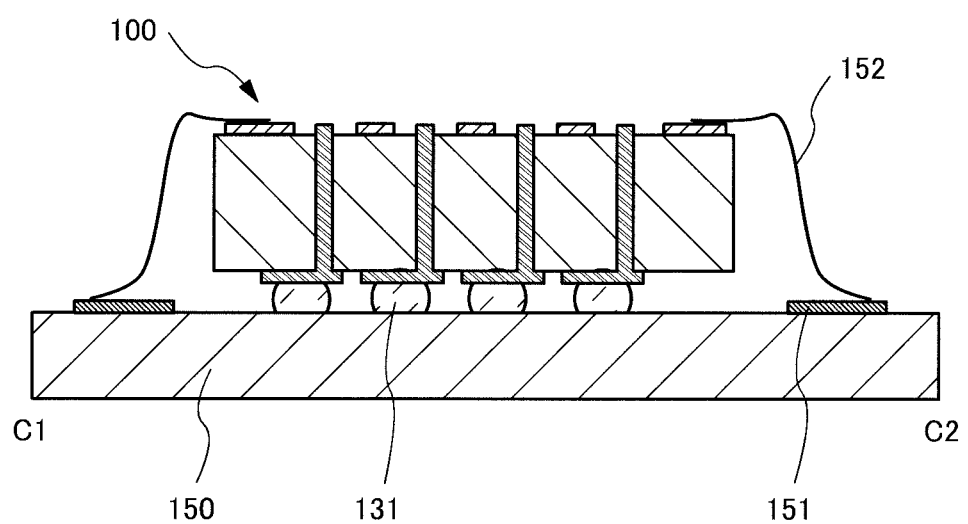
FIG. 12 is a cross-sectional view of a radiation detection element according to an embodiment of the present disclosure.

An example in which the radiation detection element 100, according to an embodiment of the present disclosure, is mounted and connected to a wiring substrate 150 will be described with reference to FIG. 11 and FIG. 12. FIG. 11 is a plan view of the wiring substrate 150 on which the radiation detection element 100 according to an embodiment of the present disclosure is mounted. FIG. 12 is a cross-sectional view along line C1-C2 shown in FIG. 11.

As shown in FIG. 11 and FIG. 12, a bonding pad 151 is provided on the wiring substrate 150. The bonding pad 151 can be connected to the cathode electrode 111 by a bonding wire 152. As the bonding wire 152, for example, a gold wire of 20 μmφ is used. A connecting method of the cathode electrode 111 and the wiring substrate 150 is not limited to wire bonding by the bonding wire 152. A connecting method of the radiation detection element 100 and the wiring substrate 150 can be changed as appropriate such as soldering by wires and a contact connection by connecting pins.

In FIG. 11 and FIG. 12, although an example of providing a connection point between the cathode electrode 111 and the wiring substrate 150 at two places is shown, the connection point between the cathode electrode 111 and the wiring substrate 150 may be situated at least at one place. By providing a plurality of connection points between the cathode electrode 111 and the wiring substrate 150, it is possible to reduce the difference in the potential distribution in the cathode electrode 111.

When the radiation detection element 100A shown in FIG. 5 is mounted and connected to the wiring substrate 150, the bonding pad 151 may be provided on the wiring substrate 150 depending on the number of the divided cathode electrodes 111A.

Although not shown, a signal processing circuit, a control circuit, and the like are formed on the wiring substrate 150. Further, the wiring substrate 150 can be connected to an external circuit with a connector component such as a FPC (Flexible printed circuit) mounted on the wiring substrate 150. The external terminal 131 mounted and connected to the wiring substrate 150 can be fixed and protected by an underfill material or a sealing resin material.

The wiring substrate 150 is dispersed with a material that causes scintillation emission by high-mass atoms such as tungsten, molybdenum, or radiation such as cesium iodide (CsI), barium fluoride ($BaF_2$), or the like. Thus, by attenuating the radiation transmitted through the radiation detection element, it is possible to reduce leakage of the radiation to the outside. The above-mentioned high-mass atoms can also be used as a conductive layer in the wiring substrate 150 shown in FIG. 9. According to the energy and type of radiation, the above-mentioned high-mass atoms can be selected as materials that absorb radiation, and substances that cause scintillation by the above-mentioned radiation can be selected as materials that convert radiation into light.

<Detection Method of Radiation Detection Element>

Before mounting the radiation detection element 100 according to the embodiment of the present disclosure on the wiring substrate 150, it is preferred to perform an open/short test of the cathode electrode 111 and the anode electrode 121. As a method for performing the open/short test, an insulation property between the cathode electrode 111 and the anode electrode 121 can be inspected by contacting the radiation detection element 100 with a conductive sheet having a cushioning property. Alternatively, for each of the plurality of anode electrodes 121, the open/short at each electrode can be confirmed by measuring a capacitance with respect to the cathode electrode 111.

After mounting the radiation detection element 100 on the wiring substrate 150, it is preferable to apply a potential required for actual operation or a test potential to confirm that there is no problem in practical use. For example, by applying −400V to the cathode electrode 111 and applying GND to each of the plurality of anode electrodes 121, it is possible to appropriately determine settings so that a required electric field is generated between the cathode electrode 111 and the anode electrode 121.

Seventh Embodiment

In this embodiment, a wiring substrate 150A in which the plurality of radiation detection elements 100 according to an embodiment of the present disclosure are mounted will be described with reference to FIG. 13 and FIG. 14.

<Structure of Radiation Detection Device>

Figure 13:
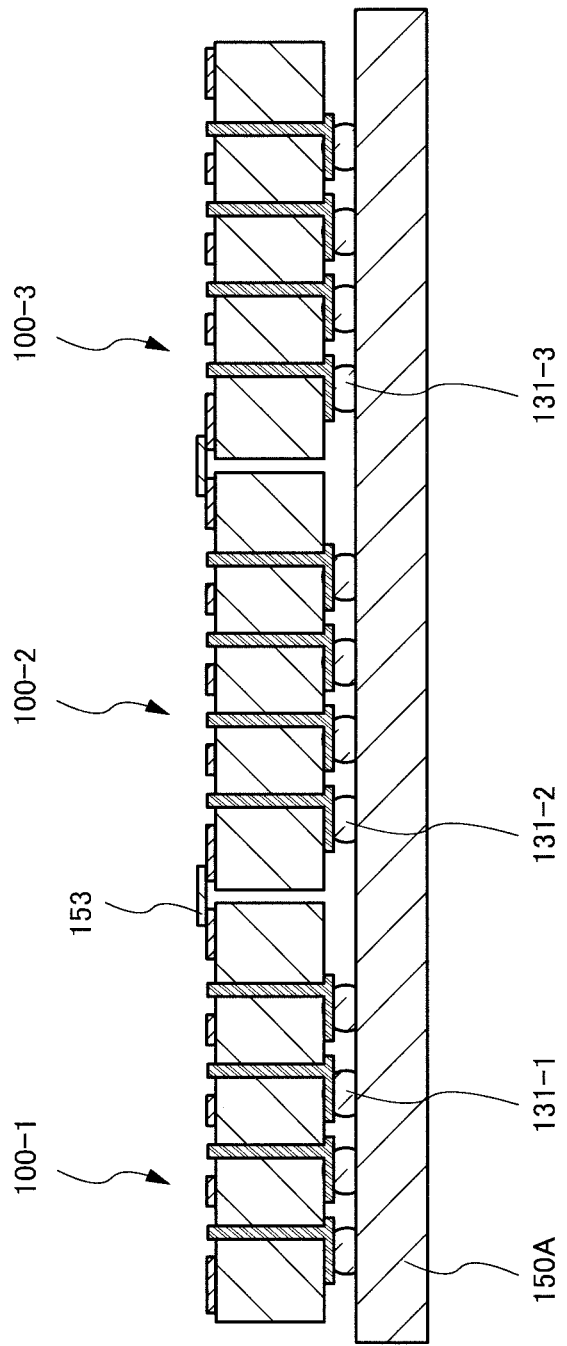
FIG. 13 is a cross-sectional view of a radiation detection element according to an embodiment of the present disclosure.

FIG. 13 shows how radiation detection elements 100-1, 100-2, and 100-3 are mounted on the wiring substrate 150A. The radiation detection element 100-1 is connected to the wiring substrate 150A by a plurality of external terminals 131-1. The radiation detection element 100-2 is connected to the wiring substrate 150A by a plurality of external terminals 131-2. The radiation detection element 100-3 is connected to the wiring substrate 150A by a plurality of external terminals 131-3.

Figure 14:
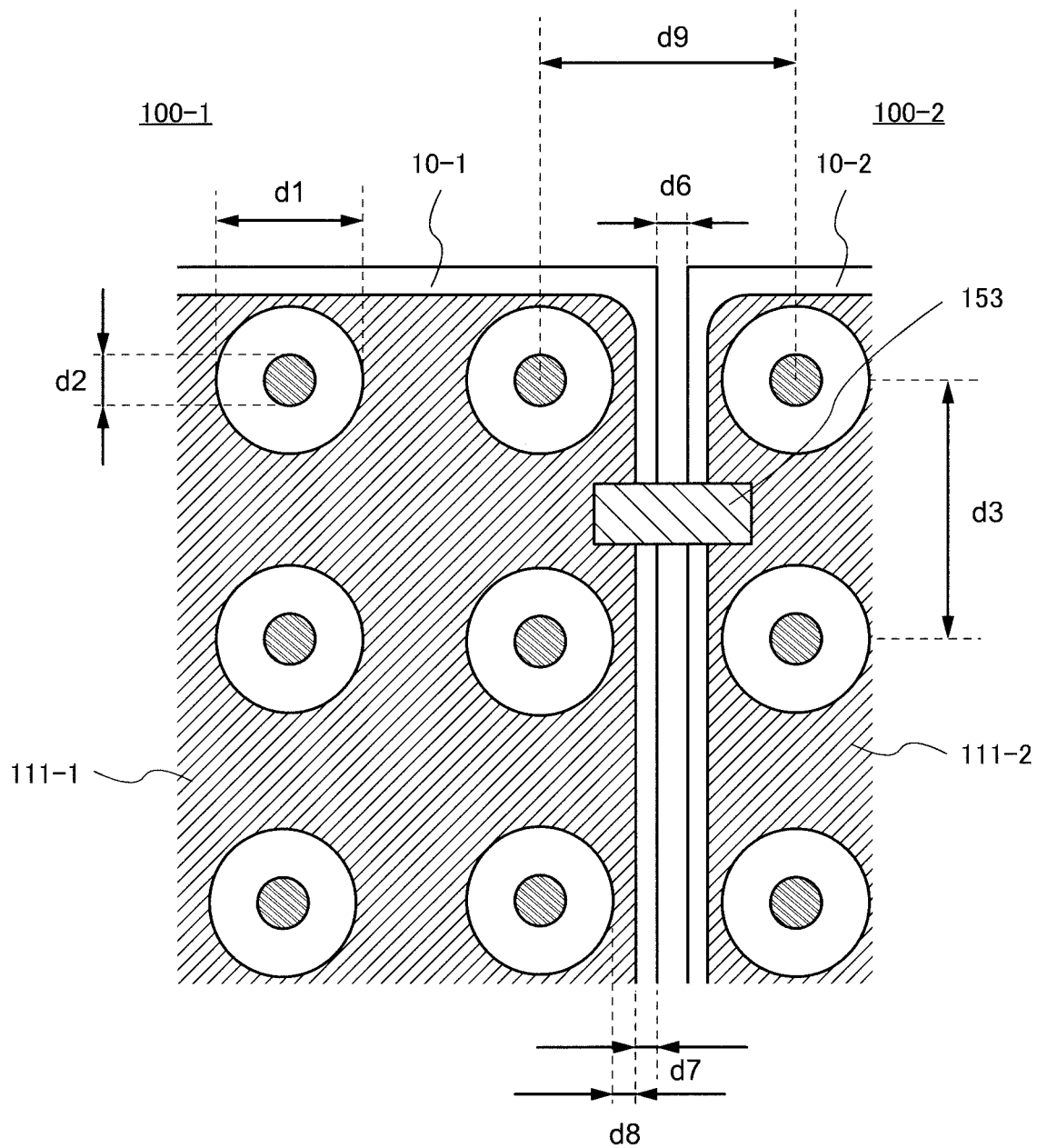
FIG. 14 is an enlarged view in a plane of a radiation detection element according to an embodiment of the present disclosure.

FIG. 14 is an enlarged view of the adjacent radiation detection element 100-1 and the radiation detection element 100-2 when viewed from above. In the radiation detection element 100-1, a cathode electrode 111-1 is arranged on a base material 10-1. In the radiation detection element 100-2, a cathode electrode 111-2 is arranged on a base material 10-2. The cathode electrode 111-1 of the radiation detection element 100-1 and the cathode electrode 111-2 of the radiation detection element 100-2 are electrically connected by a connecting portion 153. As the connecting portion 153, for example, a copper ribbon, a wire bonding, a conductive paste, and a solder connection or the like are used. In FIG. 14, an example of connecting by a copper-ribbon is shown as the connecting portion 153. By connecting the plurality of radiation detection elements 100-1, 100-2, and 100-3 by connecting portion 153, the radiation detection device 200 with the desired size can be easily configured.

In this embodiment, although an example of connecting the adjacent radiation detection element 100-1 and the radiation detection element 100-2 by connecting portion 153 is shown, the connecting method is not limited thereto. When a plurality of radiation detection elements 100B or the radiation detection elements 100C according to the third embodiment is mounted on the wiring substrate 150A, the connecting portion 153 may not be used. For example, when the plurality of radiation detection elements 100B is directly connected to the wiring substrate 150, each of the cathode electrodes 111 of the plurality of radiation detection elements 100B is directly connected to the wiring substrate 150 by the external terminal 131 connected via the through-electrode 122. Even when the cathode electrode 111 is directly connected to the wiring substrate 150A by the external terminal 131, the adjacent cathode electrode 111 may be connected using the connecting portion 153 as appropriate to stabilize the potential distribution of the cathode electrode 111.

As shown in this embodiment, by mounting the plurality of radiation detection elements on the wiring substrate 150, the radiation detection device with the desired size can be easily configured.

In the radiation detection element 100, according to the present disclosure, since the second surface 10b of the base material 10 is provided with the plurality of external terminals 131, it is possible to perform the connection to the wiring substrate 150A collectively, and it is possible to shorten the assembly manufacturing time of the radiation detection element 100.

<Each Parameter of Radiation Detection Device>

An example of each parameter of the radiation detection device 200 according to an embodiment of the present disclosure will be described below. Each parameter shown below is an example and may be changed as appropriate.

Outline of the base material: 9.6 mm-square
    Width of the cathode electrode: 9550 μm-square
    Opening diameter d1 of the cathode electrode: 250 μm
    Inner diameter d2 of the through-hole: 50 μm
    Pitch d3 of the adjacent anode electrodes: 400 μm
    Thickness of the base material: 300 μm
    Distance d6 between the adjacent base materials: 50 μm
    Distance d7 between the end of the base material and the cathode electrode: 20 μm
    Distance d8 between the end of the cathode electrode and the opening: 30 μm
    Distance d9 between the anode electrodes on the adjacent base materials: 400 μm By forming the distance between the adjacent base materials 10-1 and 10-2 to 50 μm, the distance between the anode electrode 121-1 arranged on the end of the radiation detection element 100-1, and the anode electrode 121-2 arranged on the end of the radiation detection element 100-2 becomes 400 μm. Thus, it is possible to match the distance between the adjacent anode electrodes 121 arranged in the radiation detection element 100-1 and the distance between the anode electrodes 121-1 and 121-2 of the adjacent radiation detection elements 100-1 and 100-2.

What is claimed is:

1. A radiation detection element comprising:
    a base material having a first surface and a second surface opposite to the first surface;

a first electrode penetrating the base material, electrically connected to the first surface side and the second surface side and exposed on the first surface side;
a second electrode adjacent to the first electrode in a first direction, penetrating the base material, electrically connected to the first surface side and the second surface side and exposed on the first surface side;
a third electrode adjacent to the first electrode in a second direction intersecting with the first direction, penetrating the base material, electrically connected to the first surface side and the second surface side and exposed on the first surface side;
a fourth electrode adjacent to the third electrode in the first direction, adjacent to the second electrode in the second direction, penetrating the base material, electrically connected to the first surface side and the second surface side and exposed on the first surface side;
a fifth electrode provided on the first surface, provided between the first electrode and the second electrode, between the second electrode and the third electrode, between the third electrode and the fourth electrode and between the fourth electrode and the first electrode, and separated from the first electrode, the second electrode, the third electrode and the fourth electrode;
a first external terminal electrically connected to the first electrode on the second surface side;
a second external terminal electrically connected to the second electrode on the second surface side;
a third external terminal electrically connected to the third electrode on the second surface side; and
a fourth external terminal electrically connected to the fourth electrode on the second surface side,
wherein
each of the first external terminal, the second external terminal, the third external terminal, and the fourth external terminal is a solder ball, and the first external terminal, the second external terminal, the third external terminal, and the fourth external terminal are insulated from each other, and
a region provided on the first electrode, the second electrode, the third electrode, the fourth electrode, and the fifth electrode overlaps at least one of the first external terminal, the second external terminal, the third external terminal, and the fourth external terminal in a view vertical to the first surface side of the base material.

2. The radiation detection element according to claim 1, wherein the fifth electrode surrounds each of the first electrode, the second electrode, the third electrode, and the fourth electrode.

3. The radiation detection element according to claim 1, further comprising:
a sixth electrode penetrating the base material and electrically connected to the first surface side and the second surface side and exposed on the first surface side; and
a fifth external terminal electrically connected to the sixth electrode on the second surface side,
wherein
the sixth electrode is electrically connected to the fifth electrode, and
the fifth external terminal is insulated from the first external terminal, the second external terminal, the third external terminal, and the fourth external terminal.

4. The radiation detection element according to claim 1, further comprising:
a first insulating layer provided between the fifth electrode and the base material,
wherein
a top surface of the first electrode to a top surface of the fourth electrode are exposed from a surface of the first insulating layer.

5. The radiation detection element according to claim 1, further comprising:
a seventh electrode adjacent to the third electrode in the second direction, penetrating the base material, electrically connected to the first surface side and the second surface side, and exposed on the first surface side;
a sixth external terminal electrically connected to the seventh electrode on the second surface side; and
an eighth electrode provided on the first surface side, and separated from the fifth electrode and the seventh electrode,
wherein
the sixth external terminal is insulated from the first external terminal, the second external terminal, the third external terminal, and the fourth external terminal.

6. The radiation detection element according to claim 5, wherein the eighth electrode surrounds the seventh electrode at a predetermined space.

7. The radiation detection element according to claim 1, further comprising:
a ninth electrode penetrating the base material and electrically connected to the first surface side and the second surface side and exposed on the first surface side; and
a seventh external terminal electrically connected to the ninth electrode on the second surface side,
wherein
the seventh external terminal is insulated from the first external terminal, the second external terminal, the third external terminal, and the fourth external terminal.

8. The radiation detection element according to claim 5, further comprising:
a wiring substrate electrically connected to the first external terminal, the second external terminal, the third external terminal, and the fourth external terminal,
wherein
a potential supplied to the fifth electrode is the same as a potential supplied to the eighth electrode, and is supplied from the wiring substrate.

9. A radiation detection element comprising:
a base material having a first surface and a second surface opposite to the first surface;
a first electrode penetrating the base material, electrically connected to the first surface side and the second surface side and exposed on the first surface side;
a second electrode adjacent to the first electrode in a first direction, penetrating the base material, electrically connected to the first surface side and the second surface side and exposed on the first surface side;
a third electrode adjacent to the first electrode in a second direction intersecting with the first direction, penetrating the base material, electrically connected to the first surface side and the second surface side and exposed on the first surface side;
a fourth electrode adjacent to the third electrode in the first direction, adjacent to the second electrode in the second direction, penetrating the base material, electrically connected to the first surface side and the second surface side and exposed on the first surface side;
a fifth electrode provided on the first surface, provided between the first electrode and the second electrode, between the second electrode and the third electrode, between the third electrode and the fourth electrode and between the fourth electrode and the first electrode, and separated from the first electrode, the second electrode, the third electrode and the fourth electrode;

a first external terminal electrically connected to the first electrode on the second surface side;

a second external terminal electrically connected to the second electrode on the second surface side;

a third external terminal electrically connected to the third electrode on the second surface side; and a fourth external terminal electrically connected to the fourth electrode on the second surface side, wherein each of the first external terminal, the second electrode, the third electrode, the fourth electrode, and the fourth external terminal is insulated from each other and connected to a wiring substrate, and a region provided on the first electrode, the second electrode, the third electrode, the fourth electrode, and the fifth electrode overlaps at least one of the first external terminal, the second external terminal, the third external terminal, and the fourth external terminal in a view vertical to the first surface side of the base material.

10. The radiation detection element according to claim 9, wherein the fifth electrode surrounds each of the first electrode, the second electrode, the third electrode, and the fourth electrode.

11. The radiation detection element according to claim 9, further comprising:

a sixth electrode penetrating the base material and electrically connected to the first surface side and the second surface side and exposed on the first surface side; and a fifth external terminal electrically connected to the sixth electrode on the second surface side, wherein the sixth electrode is electrically connected to the fifth electrode, and the fifth external terminal is insulated from the first external terminal, the second external terminal, the third external terminal, and the fourth external terminal.

12. The radiation detection element according to claim 9, further comprising:

a first insulating layer provided between the fifth electrode and the base material, wherein a top surface of the first electrode to a top surface of the fourth electrode are exposed from a surface of the first insulating layer.

13. The radiation detection element according to claim 9, further comprising:

a seventh electrode adjacent to the third electrode in the second direction, penetrating the base material, electrically connected to the first surface side and the second surface side, and exposed on the first surface side;

a sixth external terminal electrically connected to the seventh electrode on the second surface side; and an eighth electrode provided on the first surface side, and separated from the fifth electrode and the seventh electrode, wherein the sixth external terminal is insulated from the first external terminal, the second external terminal, the third external terminal, and the fourth external terminal.

14. The radiation detection element according to claim 13, wherein the eighth electrode surrounds the seventh electrode at a predetermined space.

15. The radiation detection element according to claim 9, further comprising:

a ninth electrode penetrating the base material and electrically connected to the first surface side and the second surface side and exposed on the first surface side; and a seventh external terminal electrically connected to the ninth electrode on the second surface side, wherein the seventh external terminal is insulated from the first external terminal, the second external terminal, the third external terminal, and the fourth external terminal.

16. The radiation detection element according to claim 13, wherein the wiring substrate is electrically connected to the first external terminal, the second external terminal, the third external terminal, and the fourth external terminal, and a potential supplied to the fifth electrode is the same as a potential supplied to the eighth electrode, and is supplied from the wiring substrate.

* * * * *